(12) United States Patent
Zhang et al.

(10) Patent No.: US 10,616,797 B2
(45) Date of Patent: Apr. 7, 2020

(54) METHOD AND DEVICE FOR TRANSMITTING INFORMATION, AND STORAGE MEDIUM

(71) Applicant: ZTE CORPORATION, Shenzhen, Guangdong (CN)

(72) Inventors: Wen Zhang, Shenzhen (CN); Shuqiang Xia, Shenzhen (CN); Bo Dai, Shenzhen (CN); Jing Shi, Shenzhen (CN); Chunli Liang, Shenzhen (CN); Xianghui Han, Shenzhen (CN); Wenfeng Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/086,814

(22) PCT Filed: Mar. 23, 2017

(86) PCT No.: PCT/CN2017/077935
§ 371 (c)(1),
(2) Date: Nov. 28, 2018

(87) PCT Pub. No.: WO2017/162194
PCT Pub. Date: Sep. 28, 2017

(65) Prior Publication Data
US 2019/0150029 A1    May 16, 2019

(30) Foreign Application Priority Data

Mar. 23, 2016  (CN) .......................... 2016 1 0173212
Apr. 1, 2016   (CN) .......................... 2016 1 0203323

(51) Int. Cl.
*H04B 3/52*  (2006.01)
*H04W 28/06* (2009.01)
(Continued)

(52) U.S. Cl.
CPC ........... *H04W 28/06* (2013.01); *H04L 1/0009* (2013.01); *H04L 1/0013* (2013.01);
(Continued)

(58) Field of Classification Search
USPC .................................. 370/455, 312; 455/434
See application file for complete search history.

(56) References Cited

U.S. PATENT DOCUMENTS 9,769,787 B2 *   9/2017  Vos .................... H04W 72/1278
2006/0285549 A1 * 12/2006  Beckmann .......... H04L 12/4633
                                                                  370/435
(Continued)

FOREIGN PATENT DOCUMENTS

CN    103427942 A    12/2013
CN    104717042 A     6/2015
(Continued)

OTHER PUBLICATIONS

International Search Report and Written Opinion for International Appl. No. PCT/CN2017/077935, dated Jun. 5, 2017.

*Primary Examiner* — Eva Y Puente
(74) *Attorney, Agent, or Firm* — Foley & Lardner LLP; Christopher J. McKenna; Paul M. H. Pua

(57) ABSTRACT

Provided are a method and device for transmitting information, and a storage medium. The method includes: determining N transmission units for a bundled transmission, wherein N>1; transmitting information over the N transmission units; and each of the transmission units includes more than one transmission block, and the transmission block supports self-decoding. Information transmitted over each of the transmission units is the same.

19 Claims, 8 Drawing Sheets

(51) Int. Cl.
*H04L 1/00* (2006.01)
*H04W 72/04* (2009.01)
*H04L 5/00* (2006.01)

(52) U.S. Cl.
CPC .......... *H04L 1/0023* (2013.01); *H04L 1/0027* (2013.01); *H04L 5/0048* (2013.01); *H04L 5/0051* (2013.01); *H04L 5/0092* (2013.01); *H04W 72/0493* (2013.01); *H04B 3/52* (2013.01)

(56) References Cited

U.S. PATENT DOCUMENTS

2009/0307554 A1* 12/2009 Marinier ............... H04L 1/1812
714/748
2011/0286378 A1* 11/2011 Kim ......................... H04W 4/06
370/312
2016/0198396 A1* 7/2016 Yoon ........................ H04W 4/80
455/434
2018/0213551 A1* 7/2018 Wang ................ H04W 72/1268

FOREIGN PATENT DOCUMENTS

CN         104938004 A    9/2015
EP         2820906 A1     1/2015

* cited by examiner

METHOD AND DEVICE FOR TRANSMITTING INFORMATION, AND STORAGE MEDIUM

CROSSREFERENCE TO RELATED APPLICATIONS

This is a National Stage Application, under 35 U.S.C. 371, of International Patent Application No. PCT/CN2017/077935, filed on Mar. 23, 2017, which claims priority to Chinese Patent Application No. CN201610173212.9, filed on Mar. 23, 2016, and Chinese Patent Application No. CN201610203323.X filed on Apr. 1, 2016, contents of all of which are incorporated herein by reference in their entireties.

TECHNICAL FIELD

The present disclosure relates to wireless communication technologies and, in particular, to a method and device for transmitting information, and a storage medium.

BACKGROUND

The rapid development of the mobile Internet and the Internet of Things has provoked an explosive growth of data traffic and the extensive emergence of diversified and differentiated services. 5G as a new generation of mobile communication technology, compared with 4G will support a higher rate (such as Gbps), massive link (such as 1M/Km2), ultra-low latency (such as 1 ms), higher reliability, and hundredfold energy efficiency improvement to support the new requirement changes. Among them, the ultra-low latency, as a key index of 5G technology, directly affects the development of latency-limited services such as the Internet of Vehicles, industrial automation, remote control, smart grid, etc. At present, researches on a series of standards on reducing 5G latency are gradually being pushed forward.

The Transmission Time Interval (TTI) reduction, as an important research direction for reducing the current latency, aims to reduce the current TTI length of 1 ms to 0.5 ms or even to a length of 1-2 Orthogonal Frequency Division Multiplexing (OFDM) symbols, which can multifoldly reduce the minimum scheduling time, thereby multifoldly reducing the single transmission latency without changing the frame structure. How to design an effective transmission method to reduce transmission latency is a problem that needs to be solved.

SUMMARY

To solve above-mentioned technical problem, embodiments of the present disclosure provide a method and device for transmitting information, and a storage medium.

The method for transmitting information provided by an embodiment of the present disclosure includes:

determining N transmission units for a bundled transmission, where N>1;

transmitting information over the N transmission units;

where a transmission time corresponding to a ith transmission unit is Mi symbols, i and Mi are positive integers, and $1 \leq i \leq N$.

In the embodiment of the present disclosure, each of the transmission units includes more than one transmission block, and the transmission block support self-decoding, or needs to be merged with other transmission blocks to decode.

In the embodiment of the present disclosure, information transmitted over each of the transmission units is the same.

In the embodiment of the present disclosure, the determining the N transmission units for the bundled transmission includes:

determining, according to a preset operation and/or a notification message of a base station, at least one of the following pieces of information:

the number of transmission units corresponding to the bundled transmission;

a Modulation and Coding Scheme (MCS) of each of the transmission units;

a Redundancy Version (RV) of the each of the transmission units;

transmission time corresponding to the each of the transmission units;

a frequency domain resource corresponding to the each of the transmission units; and a reference signal corresponding to the bundled transmission.

In the embodiment of the present disclosure, the method further includes determining the reference signal corresponding to the bundled transmission according to at least one of the following:

the number of symbols corresponding to the bundled transmission, the number of the transmission units corresponding to the bundled transmission, a type of a user equipment and an operation mode of the user equipment.

In the embodiment of the present disclosure, the transmitting information over the N transmission units includes performing the bundled transmission by one of the following:

performing a puncturing transmission on resources corresponding to a SRS bandwidth of a Sounding Reference Signal symbol;

performing a rate matching on resources outside the SRS bandwidth of the SRS symbol; and performing a transmission by skipping the SRS symbol.

In the embodiment of the present disclosure, the transmitting information over the N transmission units includes performing the bundled transmission by one of the following:

performing a puncturing transmission on resources corresponding to a Physical Downlink Control Channel (PDCCH) symbol;

performing a rate matching on resources outside the PDCCH symbol; and performing a transmission by skipping the PDCCH symbol.

In the embodiment of the present disclosure, the method further includes: not transmitting feedback information.

In the embodiment of the present disclosure, the method further includes:

determining, according to a preset operation and/or a notification message of a base station, whether to transmit feedback information.

In the embodiment of the present disclosure, the determining, according to the preset operation, whether to transmit the feedback information includes:

determining whether to transmit the feedback information according to at least one of the following:

the number of transmission units corresponding to the bundled transmission;

transmission time corresponding to the transmission units;

a MCS corresponding to the transmission units; and a frequency domain resource corresponding to the transmission units.

In the embodiment of the present disclosure, scheduling information corresponding to the bundled transmission is transmitted after a start signal of the bundled transmission.

In the embodiment of the present disclosure, the scheduling information corresponding to the bundled transmission is transmitted over a transmission unit or between two transmission units.

In the embodiment of the present disclosure, the N transmission units correspond to one piece of scheduling information, or each of the transmission units corresponds to the one piece of scheduling information.

In the embodiment of the present disclosure, the bundled transmission is performed by a frequency hopping transmission according to a specified pattern.

In the embodiment of the present disclosure, the transmission time corresponding to part or all of the N transmission units is one symbol.

In the embodiment of the present disclosure, a code rate of the transmission units meets a specified threshold requirement.

In the embodiment of the present disclosure, meeting the specified threshold requirement includes one of the following:

the code rate of the each of the transmission units meets the specified threshold requirement;

the code rate of a first transmission unit of the transmission units meets the specified threshold requirement; and the code rate of first n transmission units of the transmission units meets the specified threshold requirement, where n≤N.

In the embodiment of the present disclosure, the code rate is less than or equal to one of the following: 0.931, 0.93, and 1.

The device for transmitting information provided by an embodiment of the present disclosure includes:

a determining module, which is configured to determine N transmission units for a bundled transmission, wherein N>1;

a transmission module, which is configured to transmit information over the N transmission units; and where transmission time corresponding to an ith transmission unit is Mi symbols, i and Mi are positive integers, and 1≤i≤N.

In the embodiment of the present disclosure, each of the transmission units includes more than one transmission block, and the transmission block supports self-decoding, or needs to be merged with other transmission blocks to decode.

In the embodiment of the present disclosure, information transmitted over each of the transmission units is the same.

In the embodiment of the present disclosure, the determining module is further configured to determine, according to a preset operation and/or a notification message of a base station, at least one of the following pieces of information: the number of transmission units corresponding to the bundled transmission; a MCS of each of the transmission units; a RV of the each of the transmission units; transmission time corresponding to the each of the transmission units; a frequency domain resource corresponding to the each of the transmission units; and a reference signal corresponding to the bundled transmission.

In the embodiment of the present disclosure, the determining module is further configured to determine the reference signal corresponding to the bundled transmission according to at least one of the following: the number of symbols corresponding to the bundled transmission, the number of the transmission units corresponding to the bundled transmission, a type of a user equipment and an operation mode of the user equipment.

In the embodiment of the present disclosure, the transmission module is further configured to perform, on a cell dedicated SRS subframe, the bundled transmission by one of the following: performing a puncturing transmission on resources corresponding to a SRS bandwidth of a SRS symbol; performing a rate matching on the resources outside the SRS bandwidth of the SRS symbol; and performing a transmission by skipping the SRS symbol.

In the embodiment of the present disclosure, the transmission module is further configured to perform the bundled transmission by one of the following:

performing a puncturing transmission on resources corresponding to a PDCCH symbol.

performing a rate matching on the resources outside the physical downlink control channel symbol.

performing a transmission by skipping the physical downlink control channel symbol. In the embodiment of the present disclosure, the determining module is further configured to determine, according to a preset operation and/or a notification message, whether to transmit feedback information.

In the embodiment of the present disclosure, the determining module is further configured to determine whether to transmit the feedback information according to at least one of the following: the number of transmission units corresponding to the bundled transmission; transmission time corresponding to the transmission units; a MCS corresponding to the transmission units; and a frequency domain resource corresponding to the transmission units.

A storage medium provided by an embodiment of the present disclosure stores computer-executable instructions which are configured to execute the above-mentioned method for transmitting information.

DETAILED DESCRIPTION

To provide a more detailed understanding of features and technical contents of embodiments of the present disclosure, implementation of the embodiments of the present disclosure is described below in detail with reference to the accompanying drawings. The accompanying drawings are provided for reference only and are not intended to limit the embodiments of the present disclosure.

Figure 1:
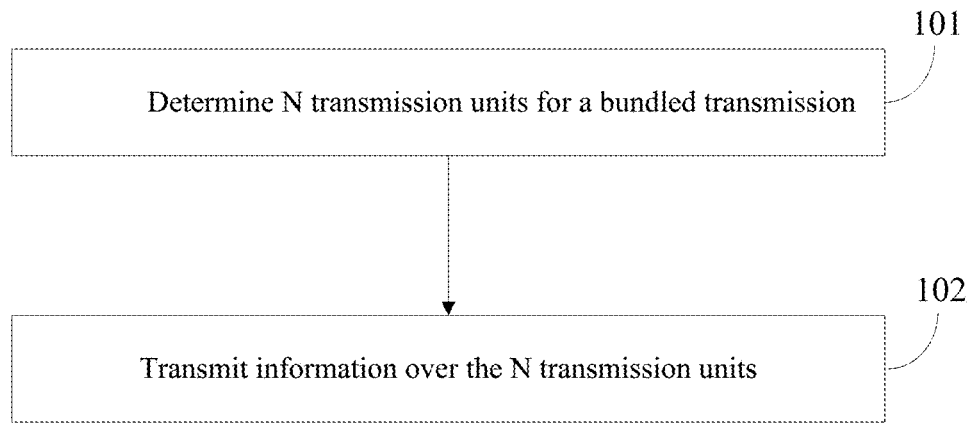
FIG. 1 is a flowchart of a method for transmitting information according to an embodiment of the present disclosure.

FIG. 1 is a flowchart of a method for transmitting information according to an embodiment of the present disclosure. As shown in FIG. 1, the method for transmitting information includes the steps described below.

In step 101, N transmission units for a bundled transmission are determined. Here, N>1. In the embodiment of the present disclosure, N transmission units bundled for transmission means that the N transmission units need to be transmitted together during transmission. For example, A, B and C are three transmission units, the bundled transmission is to transmit the transmission units A, B and C together instead of transmitting A, B and C separately.

In the embodiment of the present disclosure, each of the transmission units includes more than one transmission block. The transmission block supports self-decoding, or needs to be merged with other transmission blocks to decode. The transmission block may also be called as code words. More than one transmission block means one transmission block or more than two transmission blocks.

In the embodiment of the present disclosure, original information corresponding to each of the transmission units may be the same or different. The original information means information before modulating and coding. In one implementation mode, the original information corresponding to the transmission units is the same. That is, information transmitted over each of the transmission units is the same.

In the embodiment of the present disclosure, the determining the N transmission units for the bundled transmission includes:

determining, according to a preset operation and/or a notification message of a base station, at least one of the following pieces of information:

the number of transmission units corresponding to the bundled transmission;

a MCS of each of the transmission units;

a RV of the each of the transmission units;

transmission time corresponding to the each of the transmission units;

a frequency domain resource corresponding to the each of the transmission units; and a reference signal corresponding to the bundled transmission.

In one implementation mode, according to a preset operation, at least one of the following pieces of information is determined: the number of transmission units corresponding to the bundled transmission; a MCS of each of the transmission units; a RV of the each of the transmission units; the transmission time corresponding to the each of the transmission units; a frequency domain resource corresponding to the each of the transmission units; and a reference signal corresponding to the bundled transmission.

In another implementation mode, according to a notification message of a base station, at least one of the following pieces of information is determined: the number of transmission units corresponding to the bundled transmission; a MCS of each of the transmission units; a RV of the each of the transmission units; transmission time corresponding to the each of the transmission units; a frequency domain resource corresponding to the each of the transmission units; and a reference signal corresponding to the bundled transmission.

In another implementation mode, the first part information of the following pieces of information is determined according to a preset operation, and the second part information of the following pieces of information is determined according to the notification message of the base station: the number of transmission units corresponding to the bundled transmission; a MCS of each of the transmission units; a RV of the each of the transmission units; transmission time corresponding to the each of the transmission units; a frequency domain resource corresponding to the each of the transmission units; and a reference signal corresponding to the bundled transmission. The first part information and the second part information may be one piece of information, and may also be more than two pieces of information.

In the embodiment of the present disclosure, the method further includes determining the reference signal corresponding to the bundled transmission according to at least one of the following:

the number of symbols corresponding to the bundled transmission, the number of the transmission units corresponding to the bundled transmission, a type of a user equipment and an operation mode of the user equipment.

In the embodiment of the present disclosure, the RV of the each of the transmission units may be the same or different. The transmission time of the each of the transmission units may be the same or different.

In step 102, information is transmitted over the N transmission units.

Transmission time corresponding to an ith transmission unit is Mi symbols, i and Mi are positive integers, and 1≤i≤N.

In the embodiment of the present disclosure, after the N transmission units for the bundled transmission are determined, the information is transmitted over the N transmission units, that is, the bundled transmission is performed on the N transmission units.

In one implementation mode, the bundled transmission is performed on the N transmission units by one of the manners described below.

A puncturing transmission is performed on resources corresponding to a SRS bandwidth of a SRS symbol.

A rate matching is performed on the resources outside the SRS bandwidth of the SRS symbol.

A transmission is performed by skipping the SRS symbol.

In another implementation mode, the bundled transmission is performed on the N transmission units by one of the manners described below.

A puncturing transmission is performed on resources corresponding to a PDCCH symbol.

A rate matching is performed on the resources outside the PDCCH symbol.

The transmission is performed by skipping the physical downlink control channel symbol.

In another implementation mode of the present disclosure, no feedback information is transmitted.

In one implementation mode of the present disclosure, according to the preset operation and/or the notification message of the base station, whether to transmit the feedback information is determined.

In the embodiment of the present disclosure, according to preset operation, determining whether to transmit the feedback information includes:

determining whether to transmit the feedback information according to at least one of the following:

the number of transmission units corresponding to the bundled transmission;

transmission time corresponding to the transmission units;

a MCS corresponding to the transmission units; and a frequency domain resource corresponding to the transmission units.

In the embodiment of the present disclosure, scheduling information corresponding to the bundled transmission is transmitted after a start signal of the bundled transmission.

In the embodiment of the present disclosure, the scheduling information corresponding to the bundled transmission is transmitted over a transmission unit or between two transmission units.

In the embodiment of the present disclosure, the N transmission units correspond to one piece of scheduling information, or each of the transmission units corresponds to one piece of scheduling information.

In the embodiment of the present disclosure, the bundled transmission is performed by a frequency hopping transmission according to a specified pattern.

In the embodiment of the present disclosure, the transmission time corresponding to part or all of the N transmission units is one symbol.

In the above-mentioned solution, a code rate of the transmission units meets a specified threshold requirement.

Meeting the specified threshold requirement includes one of the following:

the code rate of each of the transmission units meets the specified threshold requirement;

the code rate of a first transmission unit of the transmission units meets the specified threshold requirement; and the code rate of first n transmission units of the transmission units meets the specified threshold requirement, where n≤N.

In the above-mentioned solution, the code rate is less than or equal to one of the following 0.931, 0.93, and 1.

The method for transmitting information provided by the embodiments of the present disclosure will be described in detail in conjunction with specific implementation scenarios.

Embodiment One

The embodiment takes transmitting uplink information as an example. The method for transmitting information may be used both for uplink and downlink.

Figure 2:
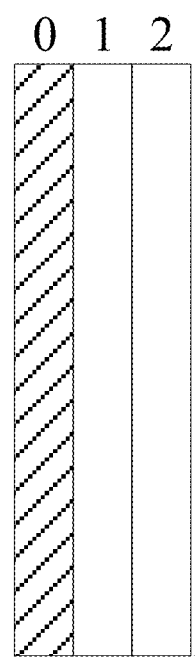
FIG. 2 is schematic diagram one of a bundled transmission according to embodiment one of the present disclosure.

As shown in FIG. 2, information transmitted by this embodiment is uplink information, the uplink information may be uplink data, may also be uplink control information. An uplink DMRS is transmitted over a symbol 0 (that is, the symbol with oblique lines), the information is transmitted over a symbol 1 and a symbol 2, one transmission unit is transmitted over the symbol 1, and another transmission unit is transmitted over the symbol 2.

Optionally, each of transmission units may be decoded independently, or need to be merged with other transmission units to decode.

Optionally, the information transmitted over the each of the transmission units is the same or different.

When the information transmitted over the each of the transmission units is the same, an Evolved NodeB (eNB) decodes data if it receives the symbol 1, then it is unnecessary to decode the transmission unit on the symbol 2, thereby reducing the information transmission latency. In FIG. 2, the symbol 1 and the symbol 2 may be considered as one transmission unit separately, or, the symbol 0 and the symbol 1 may be considered as one transmission unit and the symbol 2 is considered as another transmission unit. The transmission unit on the symbol 2 may also be demodulated by DMRS on the symbol 0.

In this embodiment of the present disclosure, the number of the transmission units may be preset. For example, the number of the transmission units may be 2, 4 or other value. Alternatively, the number of the transmission units may be notified by eNB, such as being notified in high-layer signaling or Downlink Control Information (DCI). The high-layer signaling includes a System Information Block (SIB) and/or Radio Resource Control (RRC) signaling.

In this embodiment of the present disclosure, a time length corresponding to the each of the transmission units may be the same or different. For example, a transmission time of the each of the transmission units is one symbol. Alternatively, the transmission time of one of the transmission units may be one symbol, and the transmission time of another one of the transmission unit is two symbols. Alternatively, one transmission unit may occupy part of resources of one symbol. For example, a first transmission unit occupies a second symbol and a third symbol, another transmission unit occupies the third symbol and a fourth symbol, on the third symbol, two transmission units are multiplexing, and a multiplexing mode may be at least one of the following: time division multiplexing, code division multiplexing and frequency division multiplexing. The time length of the each of the transmission units is preset, such as being fixed as one symbol, or may be notified by the eNB, such as in the high-layer signaling or the DCI. Alternatively, the time length corresponding to one of the transmission units is notified, and the time length corresponding to others of the transmission units is obtained in a preset manner. For example, the time length of the first transmission unit is notified, such as one symbol, while the time length corresponding to others of the transmission units are two symbols or three symbols.

In this embodiment of the present disclosure, the symbols corresponding to the each of the transmission units may be consecutive in time or inconsecutive in time. In one implementation mode, the symbols corresponding to the each of the transmission units may be inconsecutive in time. For example, the first transmission unit corresponds to the first symbol and the third symbol, the second transmission unit corresponds to the second symbol and the fourth symbol. In another implementation mode, the symbols corresponding to the each of the transmission units may be consecutive in time, for example, the first transmission unit corresponds to the first symbol and the second symbol, and the second transmission unit corresponds to the third symbol and the fourth symbol.

In this embodiment of the present disclosure, the RV of the each of the transmission units may be the same or different. Such as in FIG. 2, the RV of the transmission unit on the symbol 1 is 0, the RV of the transmission unit on the symbol 2 is 2, or the RVs of the transmission units on the two symbols both are 0. Information of the RV may be preset, such as in an order according to a circulation of 0, 2, 3 and 1. When there are three transmission units, the RVs are 0, 2 and 3 sequentially. When there are five transmission units, the RVs are 0, 2, 3, 1 and 0 sequentially. Alternatively, the information of the RV may be indicated by the eNB through the high-layer signaling or the DCI.

In the embodiment of the present disclosure, the MCS of the each of the transmission units may be the same or different. For example, a coding mode of the each of the transmission units is the same, but a modulation mode of the each of the transmission units is different, or the coding mode and the modulation mode are both different. Information of the MCS may be preset, such as in a ⅓ code rate and a Quadrature Phase Shift Keyin (QPSK) modulation, or notified by the eNB, such as in the high-layer signaling or the DCI. The information of the MCS may also be partly preset and partly notified in the high-layer signaling or the DCI, for example, the modulation mode is preset, and the coding mode is notified. Alternatively, the MCS of one of the transmission units is notified, and the MCSs of others of the transmission units are obtained in a preset manner, for example, the MCS of the first transmission unit is notified, and the MCSs of others of the transmission units are the same as that of the first transmission unit, or the code rates of others of the transmission units and the code rate of the first transmission unit are the same, while the modulation modes of others of the transmission units are reduced in the preset manner, or are the QPSK. For example, the modulation mode of the first transmission unit is 16 Quadrature Amplitude Modulation (QAM), and the modulation mode of the second transmission mode is the QPSK.

In the embodiment of the present disclosure, the frequency domain resources occupied by each of the transmission units may be the same or different. For example, the frequency domain resources occupied by the each of the transmission units are the same. The frequency domain resources may be preset, or may be notified by the eNB, such as in high layer signaling or DCI. Alternatively, the frequency domain resource of one of the transmission units is notified, and the frequency domain resources of others of the transmission units and the first transmission unit are obtained in a preset manner, for example, the frequency domain resource of the first transmission unit is notified in the resource allocation field of the DCI, and the frequency domain of the second transmission unit is x times the frequency domain resource of the first transmission unit, where x is a number greater than 1.

Optionally, the bundled transmission may perform a frequency hopping transmission according to a specified pattern. That is, the bundled transmission may perform the frequency hopping transmission, and increase frequency diversity gains. For example, the frequency domain resource occupied by the first transmission unit is notified by the eNB in the DCI, and the frequency domain resource occupied by others of the transmission units are determined according to the specified pattern. Alternatively, the frequency domain resource occupied by the each of the transmission units is determined by the frequency domain resource notified by the eNB and the specified pattern, and the specified pattern is preset, or notified by the eNB. The specified pattern may be frequency hopping according to the transmission units, or not according to the transmission units, such as frequency hopping according to symbols.

Figure 3:
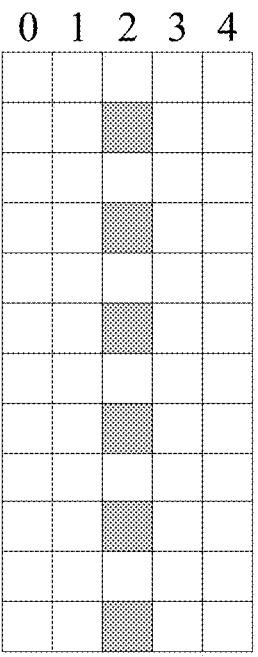
FIG. 3 is schematic diagram two of the bundled transmission according to embodiment one of the present disclosure.

The following gives an example of a DMRS occupying part of resources, as shown in FIG. 3. The MDRS is located on the symbol 2, and occupies part of subcarriers. The symbols 0, 1, 2, 3 and 4 respectively correspond to one of five transmission units. Alternatively, the symbols 0, 3 and 4 respectively correspond to one transmission unit separately. The symbol 1 and 2 respectively correspond to one of four transmission units. In this embodiment of the present disclosure, all transmission units adopt the DMRS on the symbol 2 to modulate.

In this embodiment of the present disclosure, in the transmission units, each of the transmission units has corresponding modulation information. For example, each of the transmission units corresponds to an uplink or downlink authorization to correspond to different DCIs. Alternatively, it is assumed that there are two levels of DCI, a slow DCI and a quick DCI. The low DCIs corresponding to the transmission units are the same, but the quick DCIs corresponding to the transmission units are different. Optionally, the modulation information corresponding to each of the transmission units may be transmitted on the each of the transmission units or on the symbol before the each of the transmission units.

Alternatively, one bundled transmission has only one corresponding uplink or downlink authorization. Optionally, the modulation information of the bundled transmission may be transmitted multiple times. For example, the modulation information may be transmitted on the first symbol or the last symbol of the each of the transmission units, or on the symbol before the each of the transmission units, or between each two transmission unit.

In this embodiment of the present disclosure, a reference signal is determined in the preset manner. In practice, the reference signal may be a DMRS, or other reference signals, and is not limited here. Furthermore, the MDRS is determined according to the number of symbols corresponding to the bundled transmission and/or the number of transmission units included in the bundled transmission. For example, one DMRS is disposed in each three symbols, and thus when one bundled transmission corresponds to the each three symbols, the first symbol is the DMRS, the last two symbols correspond to two transmission units. When one bundled transmission corresponds to five symbols, the first symbol and the fourth symbol are the DMRSs, and the second, third and fifth symbols correspond to three transmission units. Alternatively, the DMRS is on an even-numbered transmission block, and not on an odd-numbered transmission block. Furthermore, the DMRS may be determined according to the type of a User Equipment (UE) and/or the working mode of the UE. The working mode of the UE includes, but is not limited to, a high speed UE and a low speed UE. The type of the UE includes, but is not limited to, a legacy UE and a UE supporting different short TTIs. In this embodiment of the present disclosure, the DMRS may also be notified by the eNB.

Figure 4:
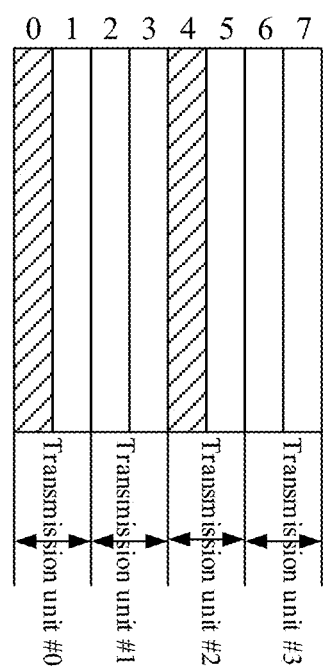
FIG. 4 is schematic diagram three of the bundled transmission according to embodiment one of the present disclosure.

For example, for the manner that each of the transmission units corresponds to an uplink or downlink authorization, whether to send the DMRS may be notified in the uplink or downlink authorization. As shown in FIG. 4, one bundled transmission includes 8 symbols. The each of the transmission units corresponds to two symbols. The uplink or downlink authorization corresponding to the each of the transmission unit may have 1 bit information to indicate whether the transmission unit includes the DMRS. As shown in FIG. 4, the uplink or downlink authorization corresponding to a transmission unit #0 and a transmission unit #2 indicates that the DMRS exists. And the uplink or downlink authorization corresponding to a transmission unit #1 and a transmission unit #3 indicates that the DMRS does not exist. Alternatively, all the transmission units correspond to one uplink or downlink authorization, and the number and/or the location of the DMRSs is notified in the uplink or downlink authorization.

In this embodiment of the present disclosure, the transmission units corresponding to the bundled transmission may be consecutive, as shown in FIG. 4, and may also be inconsecutive, such as one or more symbols, for example, the transmission unit #0 is transmitted on the symbols 0 and 1, the transmission unit #1 is transmitted on the symbols 3 and 4.

In this embodiment of the present disclosure, a receiver may perform the feedback on the transmission unit, may perform the feedback on both the transmission unit decoded correctly and all the previous transmission units, and may only perform the feedback on the transmission unit decoded correctly. For example, as shown in FIG. 4, if the receiver decodes correctly when receiving the transmission unit #1, the receiver will feed back a NACK to the transmission #0, an ACK to the transmission #1, or only an ACK to the transmission #1.

Alternatively, the receiver may also not perform the feedback, regardless of whether the receiver receives correctly. A sender will also not perform the feedback and/or a retransmission, or the sender assumes that the receiver does not perform the feedback and/or retransmission. By the bundled transmission without the feedback, the data transmission latency is reduced.

Alternatively, the sender/receiver determines whether to perform the feedback in the preset manner. Optionally, the sender/receiver may determine according to the transmission time corresponding to the transmission units. For example, it is assumed that in the N transmission units of the bundled transmission, where N>1, the transmission time corresponding to an ith transmission unit is Mi symbols, i and Mi are positive integers, and 1≤i≤N. When the minimum value of Mi is greater than a certain threshold, the receiver does not perform the feedback, or the sender assumes that the receiver does not perform the feedback. Optionally, the sender or the receiver determines whether to perform the feedback according to a MCS. For example, the maximum value of the MCSs of the transmission units is greater than a certain threshold or the minimum value of the MCSs of the transmission units is less than a certain threshold, no feedback is performed. Optionally, the sender or the receiver determines whether to perform the feedback according to the number of the transmission units included in the bundled transmission. For example, when the number of the transmission units included in the bundled transmission is greater than a certain threshold, no feedback is performed. Optionally, the sender or the receiver determines whether to perform feedback according to allocated resources. For example, when the minimum value of the allocated resources in the transmission units is greater than a half of the system bandwidth resources, no feedback is performed. Optionally, whether to perform the feedback is determined by at least two factors of the above several factors.

Figure 5:
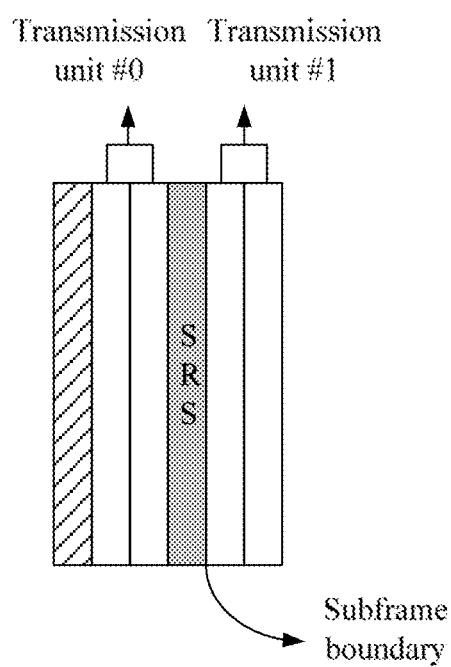
FIG. 5 is schematic diagram four of the bundled transmission according to embodiment one of the present disclosure.

Alternatively, the sender or the receiver determines whether to perform the feedback according to a notification of the eNB. For example, 1 bit indication is adopted in the SIB or RRC signaling, or in the DCI. In this embodiment of the present disclosure, on a cell dedicated SRS subframe, the operation of the UE includes one of the following: puncturing data on the SRS bandwidth of the SRS symbol, performing a rate matching on the resources outside the SRS bandwidth of the SRS symbol, and performing transmission by skipping the SRS symbol. FIG. 5 shows a schematic diagram, each of the transmission units corresponds to 2 symbols, and the bundled transmission is performed by skipping the symbol in which the SRS is located.

Similarly, for a legacy PDCCH area, the bundled transmission is performed in a similar manner. For example, data on a legacy PDCCH symbol is punctured, or a rate matching on the resources outside the legacy PDCCH symbol is performed, or a transmission is performed by skipping the legacy PDCCH symbol.

Optionally, for downlink, the modulation information of the bundled transmission may be transmitted after a start symbol of the bundled transmission. All the transmission units of the bundled transmission include 8 symbols, and the modulation information may be transmitted on the third symbols, thereby increasing the cache and the processing speed. Optionally, the modulation information of the bundled transmission may be transmitted on one symbol of a certain transmission unit, or on the symbol between two transmission units. For example, the first transmission unit occupies the symbols 0 and 1, the second transmission unit occupies the symbols 3 and 4, and the modulation information is transmitted on the symbol 2. Preferably, the modulation information is transmitted on the last symbol of the first transmission unit, or between the first transmission unit and the second transmission unit.

Preferably, each of the transmission units corresponds to one symbol, the DMRS is the symbol outside the transmission units, or the DMRS is transmitted on all or part of the transmission units. The each of the transmission units determines the RV in a preset manner, such as 0, 2, 3 and 1.

Optionally, the Minimum resource allocated or a resource allocation granularity allocated is determined by the number of symbols and/or a modulation order corresponding to the transmission units. A minimum TBS is 16 bits, with adding 24 bits CRC, there are 40 bits. The code rate of the transmission unit that the UE is able to decode may not be greater than 0.93, that is, 40/(resources×modulation order) ≤0.93. If one transmission unit corresponds to one symbol, for uplink, there are 12 available REs in one PRB. If the modulation mode is a QPSK, the minimum resources allocated are 2 PRBs, and the resource allocation granularity may also be 2 PRBs. For downlink, there are 10 available REs in the one PRB, two REs of the available REs are the REs for the CRS, and if the modulation mode is the QPSK, the minimum resource allocated is 3 PRBs, and the resource allocation granularity may also be 3 PRBs.

Embodiment Two

This embodiment of the present disclosure is similar to the embodiment one. Information transmitted in this embodiment is downlink information. A bundled transmission includes multiple transmission units.

A downlink transmission is similar to an uplink transmission. The number of transmission units, transmission time, whether symbols in each of the transmission units or between the transmission units being consecutive, a RV, a MCS, a frequency domain, a modulation mode, a determination mode of a DMRS, and the like are shown as the embodiment one.

Figure 6:
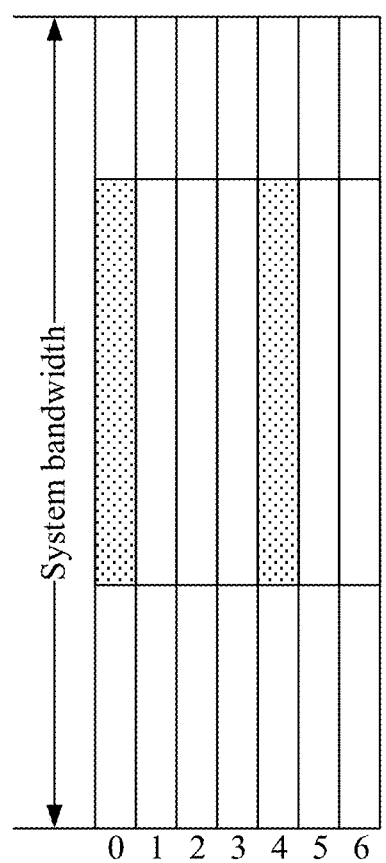
FIG. 6 is schematic diagram one of the bundled transmission according to embodiment two of the present disclosure.

FIG. 6 provides an example. The dot part is a Downlink Control Channel. A symbol 1, symbol 2 and symbol 3 are a Physical Downlink Shared Channel (PDSCH) for the bundled transmission. Each symbol may correspond to one transmission unit. An area of the Downlink Control Channel is detected, that is the area of the dot part in the FIG. 6 is preset, or notified by eNB, such as notified in a SIB or RRC signaling or a legacy PDCCH. An area for sending the PDSCH is the same as the detected area of the Downlink Control Channel. Alternatively, a resource allocation of the PDSCH may be indicated in the Downlink Control Channel.

Figure 7:
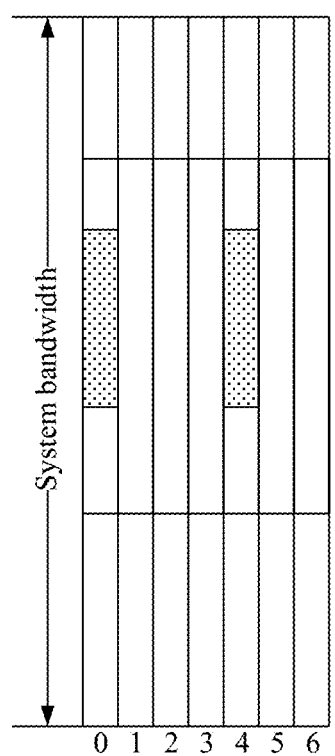
FIG. 7 is schematic diagram two of the bundled transmission according to embodiment two of the present disclosure.

FIG. 7 provides an example. The dot part is the Downlink Control Channel. The area of the Downlink Control Channel is detected, that is, the area of the dot part in FIG. 6 is preset, or notified by the eNB, such as notified in the SIB or RRC signaling or the legacy PDCCH. The area for sending the PDSCH is preset. Alternatively, the resource allocation of the PDSCH may be indicated in the Downlink Control Channel. In FIG. 7, symbol 0, symbol 1, symbol 2 and symbol 3 may respectively correspond to one of four transmission units. Alternatively, a symbol in which a control channel is located and a latter symbol correspond to one transmission unit, for example, symbol 0 and symbol 1 may correspond to one transmission unit, and the symbol 2 and symbol 3 correspond to one transmission unit.

In this embodiment of the present disclosure, the detected area of control information may be consecutive or inconsecutive on the frequency domain. The detected area of the control information is renumbered and a CCE and a search space are defined.

In this embodiment of the present disclosure, time of detecting the control information may be preset, or notified by the eNB, such as in high-layer signaling or the legacy PDCCH.

For a Multimedia Broadcast multicast service Single Frequency Network (MBSFN) subframe notified by the eNB, the bundled transmission skips the MBSFN subframe. Alternatively, the bundled transmission punctures data corresponding to the MBSFN subframe. Alternatively, the bundled transmission is stopped before the MBSFN subframe, for example, it is assumed that the bundled transmission scheduled by an eNB has seven symbols, four of the seven symbols have been transmitted on a previous subframe of the MBSFN subframe, and the remaining three symbols are not transmitted.

Preferably, each of the transmission units corresponds to one symbol. The downlink control information of the bundled transmission is scheduled to transmit on the symbol outside the transmission units. Alternatively, The downlink control information of the bundled transmission is scheduled to transmit on all or part of the transmission units. Each of the transmission units determines the RV in a preset manner, for example, the RVs sequentially are 0, 2, 3 and 1.

Embodiment Three

This embodiment provides a bundled transmission method which may be used for both uplink and downlink.

The bundled transmission may perform a rate matching during a whole transmission time. Here, the whole transmission time refers to transmission time corresponding to all the transmission units. That is, encoded bits are sequentially and cyclically mapped to all the transmission units. That is, the encoded bits are mapped to a first transmission unit first, then mapped to a second transmission unit, and sequentially mapped to all the transmission units. Optionally, some transmission units are incapable of self-decoding.

For example, one transmission unit corresponds to one symbol, and the encoded bits are sequentially and cyclically mapped to all symbols.

Optionally, for PUSCH, transmission bits of the PUSCH are mapped column by column in an interleaving matrix. That is, the transmission bits are mapped in the first column, then in the next column. After the interleaving process is completed, the transmission bits are read out column by column.

Embodiment Four

This embodiment of the present disclosure proposed an information transmission process of a UE which supports a short TTI. In this embodiment of the present disclosure, the UE which supports the short TTI is written into an sUE, channels for transmitting information are added with "s", for example, a downlink data channel is a sPDSCH.

Figure 8:
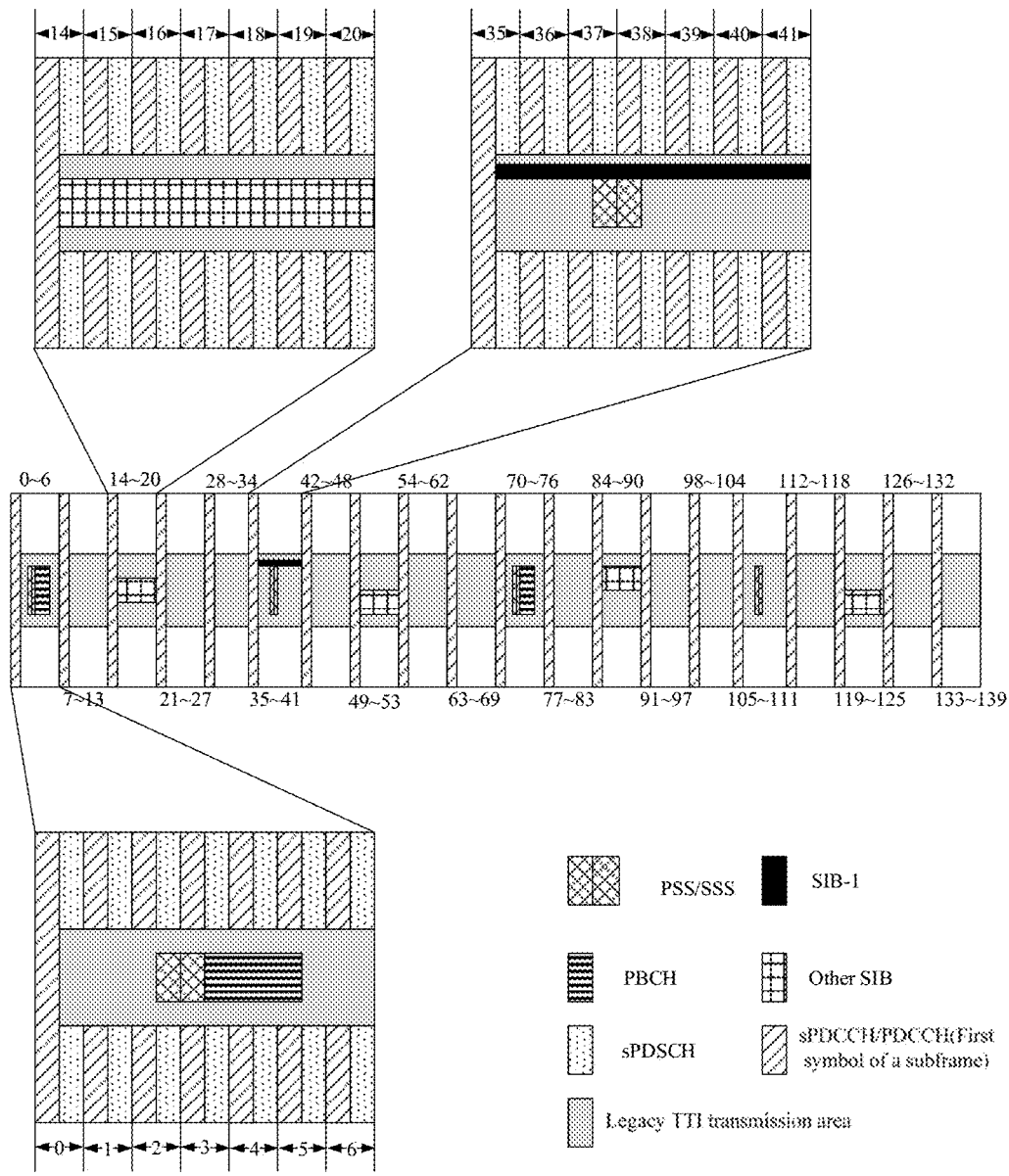
FIG. 8 is schematic diagram one of the bundled transmission according to embodiment three of the present disclosure.

For downlink, the network divides a system bandwidth to obtain a part of area of the system bandwidth to be used for the transmission of a Master Information Block (MIB), SIB, legacy UE, RAR related to the sUE, Msg4, and the like when TTI is 1 ms, as shown in FIG. 8. Another part of area of the system bandwidth is used for the transmission of the short TTI. The area division is preset or notified by the eNB, such as notified through a SIB or RRC signaling or a DCI. A TTI length in FIG. 8 is two symbols, in practice, the TTI length is not limited to this TTI length, and the TTI length is variable. A unicast service (a low latency and high reliability service) of the sUE is transmitted in an area outside the gray area. The gray area is transparent to the Legacy UE. However, the eNB needs to notify the transmission area of the sUE to the sUE, the transmission area is an area for the sUE transmitting the sPDCCH and/or the sPDSCH. For example, for a system with 20 MHz, the eNB notifies the sUE to transmit on 60 marginal Physical Resource Blocks (PRBs). Optionally, resources are mapped by the sPDCCH on the 60 PRBs, and CCE is defined on the 60 PRBs. FIG. 8 further shows a schematic diagram of PSS, SSS, PBCH, SIB, PDCCH, SPDCCH, and the like on 140 TTIs.

Optionally, the sUE receives on a legacy TTI transmission area at least one of the follow: PSS, SSS, PBCH, SIB, RAR and Msg4. After receiving information on adopting the short TTI to transmit indicated by the eNB, the sUE transmits on a short TTI area.

In this embodiment of the present disclosure, before receiving information on adopting the short TTI to transmit indicated by the eNB, the sUE transmits on the legacy TTI transmission area.

In practice, the area division is not limited to the above-mentioned example. In this embodiment of the present disclosure, the short TTI may occupy multiple inconsecutive frequency domain areas on a frequency domain. In this embodiment of the present disclosure, each frequency domain area corresponds to a different TTI length.

Figure 9:
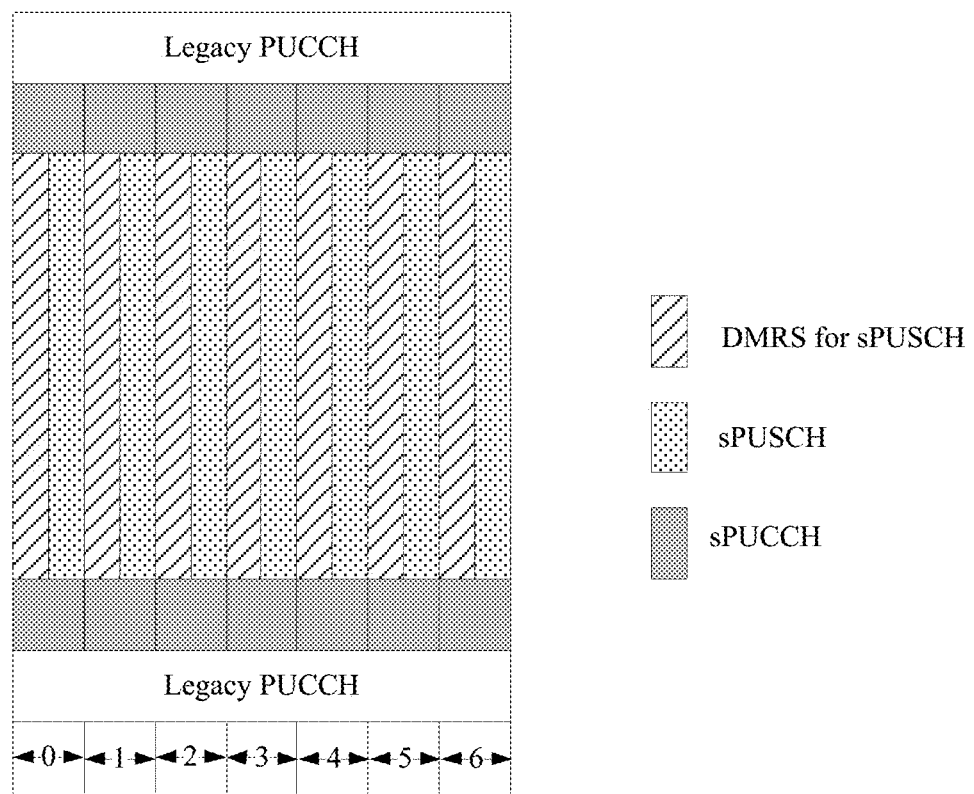
FIG. 9 is schematic diagram two of the bundled transmission according to embodiment three of the present disclosure.
Figure 10:
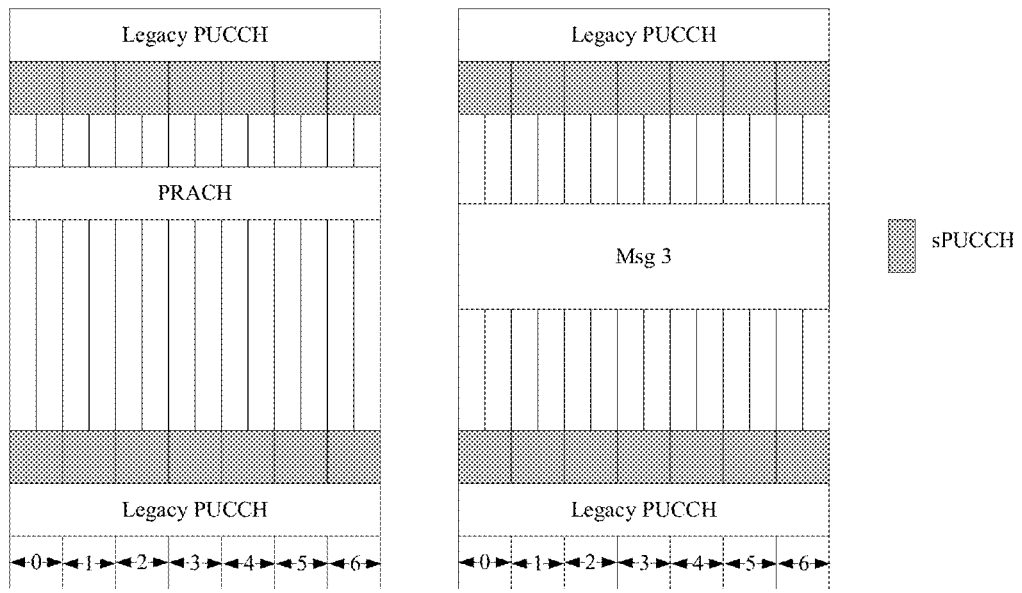
FIG. 10 is schematic diagram three of the bundled transmission according to embodiment three of the present disclosure.

For uplink, the sUE determines, an area of a Physical Random Access Channel (PRACH), legacy PUCCH or S-PUCCH by detecting a SIB and cell-specific signaling. FIG. 9 and FIG. 10 show schematic diagrams of uplink transmission. Accordingly, when the UE uses a PUCCH to perform a HARQ feedback on a Msg4, the following two schemes A and B may be used.

Scheme A: a PUCCH feedback of 1 ms is used.

Scheme B: a sPUCCH feedback is used.

In this embodiment of the present disclosure, after a RRC connection is established, the sPDSCH or a sPUSCH may adopt a pre-scheduling manner to reduce latency.

Embodiment Five

This embodiment provides an information transmission process of a UE which supports a short TTI.

A system bandwidth is divided into two carriers, which are a CC-1 and a CC-2 separately. For downlink (DL), a MIB, SIB, RAR related to a sUE, Msg4 and Legacy UE are all transmitted on a DL CC-1, and TTI is 1 ms. After a RRC connection is completed, or information on adopting the short TTI to transmit indicated by the eBN is received, the sUE adopts short TTI to transmit on a DL CC-2.

For a UL, PRACH and Msg3 are both transmitted on the UL CC-1. After the RRC connection is completed, or information on adopting the short TTI to transmit indicated by the eBN is received, PRACH and Msg3 adopt short TTI to transmit on the DL CC-2.

Apparently, according to the logic of a LTE CA, the CC-1 is a primary cell, and the CC-2 is a secondary cell. What is different from the existing Long-Term Evolution (LTE) is:

the sPUCCH is required to be sent on the secondary cell;

in the LTE CA, the secondary cell does not support Semi-Persistent Scheduling (SPS), and the secondary cell is required to support an enhanced SPS mode or a pre-scheduling in order to reduce latency.

Embodiment Six

In the above-mentioned embodiments, a bundled transmission includes multiple transmission units. This embodiment provides a code rate requirement of the bundled transmission.

Optionally, a code rate of the transmission units meets a specified threshold requirement. For example, the code rate of each of the multiple transmission units is less than or equal to one of the following: 0.931, 0.93, and 1.

Optionally, the code rate of a first transmission unit meets the specified threshold requirement. For example, the code rate of the first transmission unit is less than or equal to one of the following: 0.931, 0.93, and 1.

Optionally, the code rate corresponding to first n transmission units meets the specified threshold requirement, where n is less than or equal to the number of transmission units included in the bundled transmission. The code rate of the first n transmission units is the code rate calculated by taking all transmission resources of the first n transmission units as the transmission resources. For example, for uplink transmission, three transmission units are provided. Each of the transmission units corresponds to one symbol. The each of the transmission units transmits a same TBS, a same modulation order Qm, a same RE number, then the code rate of first 2 transmission units is: (TBS+24)/(2×Qm×S). 24 is a bit number of a CRC. 2 of the denominator represents two transmission units, and S is the RE number of one transmission unit. Alternatively, the modulation order of the first transmission unit is Qm1, the RE number is S1, the modulation order of the second transmission unit is Qm2, the RE number is S2, then the code rate of the first two transmission units is: (TBS+24)/(Qm1 ×S1 +Qm2 ×S2 ). Optionally, the code rate of the first two transmission units is less than or equal to one of the following: 0.931, 0.93, and 1.

Figure 11:
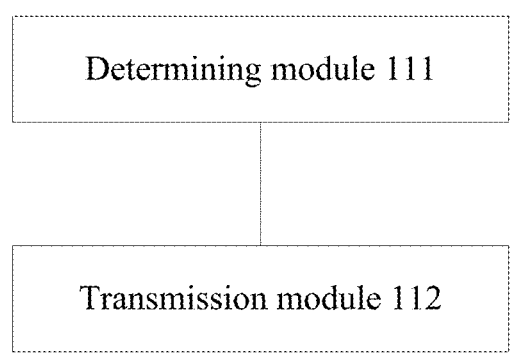
FIG. 11 is a structure diagram of a device for transmitting information according to an embodiment of the present disclosure.

FIG. 11 is a structure diagram of a device for transmitting information according to an embodiment of the present disclosure. As shown in FIG. 11, the device for transmitting information includes a determining module 111 and a transmission module 112.

T determining module 111 is configured to determine N transmission units for a bundled transmission, where N>1.

The transmission module 112 is configured to transmit information over the N transmission units.

Transmission time corresponding to a ith transmission unit is Mi symbols, i and Mi are positive integers, and 1≤i≤N.

In one implementation mode of the present disclosure, each of the transmission units includes more than one transmission block, and the transmission block supports self-decoding, or needs to be merged with other transmission blocks to decode.

In one implementation mode of the present disclosure, information transmitted over the each of the transmission unit is the same.

In one implementation mode of the present disclosure, the determining module 111 is further configured to determine, according to a preset operation and/or a notification message, at least one of the following pieces of information: the number of transmission units corresponding to the bundled transmission; a MCS of each of the transmission units; a RV of the each of the transmission units; transmission time corresponding to the each of the transmission units; a frequency domain resource corresponding to the each of the transmission units; and a reference signal corresponding to the bundled transmission.

In one implementation mode of the present disclosure, the determining module 111 is further configured to determine the reference signal corresponding to the bundled transmission according to at least one of the following: the number of symbols corresponding to the bundled transmission, the number of transmission units corresponding to the bundled transmission, a type of a user equipment and an operation mode of the user equipment.

In one implementation mode of the present disclosure, the transmission unit 112 is further configured to perform, on a cell dedicated SRS subframe, the bundled transmission by using one of the modes described below: a puncturing transmission is performed on resources corresponding to a SRS bandwidth of a SRS symbol; a rate matching is performed on the resources outside the SRS bandwidth of the SRS symbol; and a transmission is performed by skipping the SRS symbol.

In one implementation mode of the present disclosure, the transmission module 112 is further configured to perform the bundled transmission by using one of the modes described below: performing a puncturing transmission on resources corresponding to a PDCCH symbol; performing a rate matching on the resources outside the PDCCH symbol; and performing a transmission by skipping the PDCCH symbol.

In one implementation mode of the present disclosure, transmission module 112 is further configured to transmit feedback information.

In one implementation mode of the present disclosure, the determining module 111 is further configured to determine, according to the preset operation and/or the notification message, whether to transmit the feedback information.

In one implementation mode of the present disclosure, the determining module 111 is further configured to determine whether to transmit the feedback information according to at least one of the following: the number of transmission units corresponding to the bundled transmission; transmission time corresponding to the transmission units; a MCS corresponding to the transmission units; and a frequency domain resource corresponding to the transmission units.

In one implementation mode of the present disclosure, scheduling information corresponding to the bundled transmission is transmitted over a transmission unit or between two transmission units.

In one implementation mode of the present disclosure, the N transmission units correspond to one piece of scheduling information, or each of the transmission units corresponds to one piece of scheduling information.

In one implementation mode of the present disclosure, the bundled transmission performs a frequency hopping transmission according to a specified pattern.

In one implementation mode of the present disclosure, the transmission time corresponding to part or all of the N transmission units is one symbol.

It is to be understood by those skilled in the art that implementation of functions of various units of the device for transmitting information in FIG. 11 may be understood with reference to the description of the foregoing method for transmitting information. The functions of the various units of the device for transmitting information in FIG. 11 may be implemented by one or more programs running on a processor or by one or more specific logic circuits.

If not in collision, the technical solutions described in embodiments of the present disclosure may be combined with each other.

The device for transmitting information described in the embodiments of the present disclosure may also be stored in a computer-readable storage medium if the device for transmitting information is implemented in the form of software function module and sold or used as independent products. Based on this understanding, the technical solutions provided by the embodiments of the present disclosure substantially, or the part contributing to the related art, may be embodied in the form of a software product. The software product is stored on a storage medium and includes several instructions for enabling a computer device (which may be a personal computer, a server or a network device) to execute all or part of the methods provided by the embodiments of the present disclosure. The foregoing storage medium may be a U disk, a mobile hard disk, a read only memory (ROM), a magnetic disk, an optical disk or various mediums that can store program codes. In this way, the embodiments of the present disclosure are not limited to any specific combination of hardware and software.

Accordingly, a storage medium further provided by an embodiment of the present disclosure stores computer-executable instructions which are configured to execute the above-mentioned method for transmitting information.

It is to be understood that the methods and smart devices disclosed by the embodiments of the present disclosure may be implemented in other ways. The device embodiments described above are merely exemplary. For example, the unit division is merely a logical function division, and, in practice, the unit division may be implemented in other ways. For example, multiple units or components may be combined or may be integrated into another system, or some features may be omitted or not executed. Additionally, coupling, direct coupling or communication connection between the presented or discussed components may be indirect coupling or communication connection, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to actual requirements to achieve objects of solutions of embodiments of the present disclosure.

Moreover, various function units in the embodiments of the present disclosure may all be integrated in one second processing unit, or each unit may be used as a separate unit, or two or more units may be integrated into one unit. The integrated function unit may be implemented by hardware or may be implemented by hardware plus a software function unit.

The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure.

INDUSTRIAL APPLICABILITY

In the technical solutions in the embodiments of the present disclosure, N transmission units for a bundled transmission are determined. Information is transmitted over the N transmission units. Each of transmission units includes multiple transmission block and the transmission block support self-decoding or need to be merged with other transmission blocks to decode. The method for transmitting information proposed by the embodiments of the present disclosure may reduce the transmission latency.

What is claimed is:

1. A method for transmitting information, comprising:
    determining N transmission units for a bundled transmission, wherein N>1; and
    transmitting information over the N transmission units;
    wherein transmission time corresponding to an ith transmission unit is Mi symbols, i and Mi are positive integers, and $1 \leq i \leq N$;
    wherein the determining the N transmission units for the bundled transmission comprises:
        determining, according to a notification message of a base station, at least one of the following pieces of information:
        a number of transmission units corresponding to the bundled transmission;
        a modulation and coding scheme of each of the transmission units;
        a Redundancy Version of the each of the transmission units;
        transmission time corresponding to the each of the transmission units;
        a frequency domain resource corresponding to the each of the transmission units; and
        a reference signal corresponding to the bundled transmission.

2. The method for transmitting information according to claim 1, wherein the each of the transmission units comprises more than one transmission block, and a first transmission block of the more than one transmission block supports self-decoding, or the first transmission block is to be merged with other transmission blocks to decode.

3. The method for transmitting information according to claim 1, wherein information transmitted over the each of the transmission units is the same.

4. The method for transmitting information according to claim 1, wherein the method further comprises: determining the reference signal corresponding to the bundled transmission according to at least one of the following:
    a number of symbols corresponding to the bundled transmission,
    the number of the transmission units corresponding to the bundled transmission,
    a type of a user equipment; and
    an operation mode of the user equipment.

5. The method for transmitting information according to claim 1, wherein the transmitting information over the N transmission units comprises performing the bundled transmission by one of the following:
    performing a puncturing transmission on resources corresponding to a Sounding Reference Signal bandwidth of a Sounding Reference Signal symbol;
    performing a rate matching on the resources outside the Sounding Reference Signal bandwidth of the Sounding Reference Signal symbol; and
    performing a transmission by skipping the Sounding Reference Signal symbol.

6. The method for transmitting information according to claim 1, wherein the transmitting information over the N transmission units comprises performing the bundled transmission by one of the following:

performing a puncturing transmission on resources corresponding to a Physical Downlink Control Channel symbol;

performing a rate matching on resources outside the Physical Downlink Control Channel symbol; and performing a transmission by skipping the Physical Downlink Control Channel symbol.

7. The method for transmitting information according to claim 1, wherein the method further comprises:

not transmitting feedback information.

8. The method for transmitting information according to claim 1, wherein the method further comprises:

determining, according to the notification message of the base station, whether to transmit feedback information.

9. The method for transmitting information according to claim 8, wherein the determining, whether to transmit the feedback information comprises:

determining whether to transmit the feedback information according to at least one of the following:

the number of transmission units corresponding to the bundled transmission;

transmission time corresponding to the transmission units;

a Modulation and Coding Scheme corresponding to the transmission units; and a frequency domain resource corresponding to the transmission units.

10. The method for transmitting information according to claim 1, wherein scheduling information corresponding to the bundling transmission is transmitted after a start symbol of the bundled transmission.

11. The method for transmitting information according to claim 10, wherein the scheduling information corresponding to the bundled transmission is transmitted over a transmission unit or between two transmission units.

12. The method for transmitting information according to claim 1, wherein the N transmission units correspond to one piece of scheduling information, or each of the transmission units corresponds to one piece of scheduling information.

13. The method for transmitting information according to claim 1, wherein the bundled transmission is performed by a frequency hopping transmission according to a specified pattern.

14. The method for transmitting information according to claim 1, wherein the transmission time corresponding to part or all of the N transmission units is one symbol.

15. The method for transmitting information according to claim 1, wherein a code rate of the transmission units meets a specified threshold requirement.

16. The method for transmitting information according to claim 15, wherein meeting the specified threshold requirement comprises one of the following:

the code rate of each of the transmission units meets the specified threshold requirement;

the code rate of a first transmission unit of the transmission units meets the specified threshold requirement;

the code rate of first n transmission units of the transmission units meets the specified threshold requirement, wherein n≤N.

17. The method for transmitting information according to claim 15, wherein the code rate is less than or equal to one of: 0.931, 0.93, and 1.

18. A device for transmitting information, comprising a processor and a storage device storing computer executable instructions that when executed by the processor cause the processor to perform a method for transmitting information comprising:

determining N transmission units for a bundled transmission, wherein N>1; and transmitting information over the N transmission units;

wherein transmission time corresponding to an ith transmission unit is Mi symbols, i and Mi are positive integers, and 1≤i≤N;

wherein the determining the N transmission units for the bundled transmission comprises:

determining, according to a notification message of a base station, at least one of the following pieces of information:

a number of transmission units corresponding to the bundled transmission;

a modulation and coding scheme of each of the transmission units;

a Redundancy Version of the each of the transmission units;

transmission time corresponding to the each of the transmission units;

a frequency domain resource corresponding to the each of the transmission units; and a reference signal corresponding to the bundled transmission.

19. A non-transitory computer-readable storage medium, wherein the storage medium stores computer-executable instructions which are configured to execute a method for transmitting information comprising:

determining N transmission units for a bundled transmission, wherein N>1; and transmitting information over the N transmission units;

wherein transmission time corresponding to an ith transmission unit is Mi symbols, i and Mi are positive integers, and 1≤i≤N;

wherein the determining the N transmission units for the bundled transmission comprises:

determining, according to a notification message of a base station, at least one of the following pieces of information:

a number of transmission units corresponding to the bundled transmission;

a modulation and coding scheme of each of the transmission units;

a Redundancy Version of the each of the transmission units;

transmission time corresponding to the each of the transmission units;

a frequency domain resource corresponding to the each of the transmission units; and a reference signal corresponding to the bundled transmission.

* * * * *